United States Patent [19]

Crews et al.

[11] Patent Number: 5,423,908
[45] Date of Patent: Jun. 13, 1995

[54] VISCOSITY-STABLE HIGH SOLIDS ROSIN-PHENOLIC RESIN SOLUTIONS

[75] Inventors: Everett Crews, Charleston; J. George Hayden, Isle of Palms; G. Frederick Hutter, Charleston, all of S.C.

[73] Assignee: Westvaco Corporation, New York, N.Y.

[21] Appl. No.: 315,548

[22] Filed: Sep. 30, 1994

Related U.S. Application Data

[63] Continuation-in-part of Ser. No. 80,728, Jun. 28, 1993, abandoned.

[51] Int. Cl.$^6$ .................. C09D 11/08; C08K 5/01; C08K 5/053
[52] U.S. Cl. ..................... 106/30 R; 524/249; 524/250; 524/386; 524/390
[58] Field of Search ............... 524/272, 187, 239, 247, 524/249, 250, 378, 381, 386, 390; 106/30 R

[56] References Cited

U.S. PATENT DOCUMENTS

| | | | |
|---|---|---|---|
| 3,413,250 | 11/1968 | Varron et al. | 524/272 |
| 3,884,707 | 5/1975 | Dick et al. | 524/249 |
| 4,243,762 | 1/1981 | McClain | 524/247 |
| 4,643,848 | 2/1987 | Thomas et al. | 530/213 |
| 4,857,624 | 8/1989 | DeBlasi et al. | 106/30 R |

FOREIGN PATENT DOCUMENTS 0136911 10/1979 Japan.

*Primary Examiner*—Tae H. Yoon
*Attorney, Agent, or Firm*—Daniel B. Reece, IV; Terry B. McDaniel; Richard L. Schmalz

[57] ABSTRACT

The invention relates to improved solution phenolics and the process for preparing them. In particular, the invention relates to viscosity-stable high solids solutions of esters of rosin-phenol condensates having properties which make them useful in formulating vehicles for gravure printing inks.

7 Claims, No Drawings

VISCOSITY-STABLE HIGH SOLIDS ROSIN-PHENOLIC RESIN SOLUTIONS

FIELD OF INVENTION

This application is a continuation-in-part of our commonly assigned, co-pending U.S. patent application Ser. No. 08/080,728 filed Jun. 28, 1993, now abandoned, entitled "Viscosity-Stable High Solids Rosin-Phenolic Resin Solutions." The invention relates to novel solution phenolics and the process for preparing them. In particular, the invention relates to viscosity-stable high solids solutions of esters of rosin-phenol condensates having properties which make them useful in formulating vehicles for gravure printing inks.

BACKGROUND OF THE INVENTION

Hydrocarbon solutions of resin esters of rosin-phenol condensates are known in the ink industry as solution phenolics. Solution phenolics are commonly employed by ink manufacturers in formulating vehicles for gravure printing inks. However, a major problem exists with the use of solution phenolics in that they tend to increase in viscosity over time. The rate of this viscosity growth is concentration-dependent, thereby worsening as the level of resin solids contained in a solution increases (see Table I below). Compounding this problem is the fact that viscosity growth in solution phenolics is also accompanied by undesirable variations in dilution values. As these time-dependent differences in the physical properties of solution phenolics cannot be predicted easily, the resulting variabilities create major problems for ink manufacturers.

These twin problems of viscosity growth and dilution value variation are graphically shown by the data listed in Table I below. Here, varying amounts of JONREZ® RP-346 (a rosin-phenolic resin manufactured by Westvaco, Inc.) were dissolved in toluene to produce solutions having differing resin solid levels. These solution phenolics were sealed in jars to prevent toluene evaporation and held at ambient temperatures (about 25° C.) for 2 weeks.

TABLE I

Viscosity Growth as a Function of Time and Solids For Untreated Solution Phenolics

| Percent Solids[a] | Physical Property | Day 1 | Day 7 | Day 14 | Percent Change |
|---|---|---|---|---|---|
| 45 | Brookfield Viscosity (cP) | 16,800 | 41,000 | 88,530 | 427 |
|  | Dilution[b] (mL) | 297 | 297 | 314 | 6 |
| 37 | Brookfield Viscosity (cP) | 1100 | 1950 | 3050 | 177 |
|  | Dilution | 198 | 213 | 198 | 0 |
| 30 | Brookfield Viscosity (cP) | 190 | 205 | 336 | 77 |
|  | Dilution[b] | 130 | 144 | 140 | 8 |

[a]Nominal percent solids. Actual solids ranged less than ± 0.5 units.
[b]Dilution is reported as the milliliters of toluene added to 100 grams of RP-346 solution (at indicated initial solids level) to lower its viscosity to 18 seconds in a #2 Shell cup at roughly 25° C.

Table I shows that the rate of viscosity growth was proportional to the percent solids of the aged solution: the higher the solids level, the greater the increase in viscosity over time. For example, at 45% nominal solids a toluene solution of JONREZ RP-346 increased 427% (from 16,800 cP to 88,530 cP) in 14 days. At 37.5% nominal solids, a toluene solution of JONREZ RP-346 increased 177% in viscosity (from 1100 cP to 3050 cP) in 14 days. At 30% solids, a toluene solution of JONREZ RP-346 only increased 77% in viscosity in 14 days.

Heretofore there has been no solution to this problem; thus the ink industry is currently limited to retarding viscosity growth by utilizing rosin-phenolic resin solutions containing low solids concentrations (i.e., below 25% solids). The ability to create rosin-phenolic resin solutions which are viscosity stable at high solids levels would be greatly advantageous to the industry, especially in the areas of solution formulation, transport, and storage.

Therefore, it is the object of this invention to produce viscosity-stable high solids rosin-phenolic resin solutions for use in the formulation of vehicles for gravure printing inks.

SUMMARY OF THE INVENTION

This objective is achieved by the addition of a polyalkanolamine or a polyether alcohol to the hydrocarbon solution of esters of rosin-phenol condensates. The resulting solutions are both viscosity stable and dilution stable, even at high solid levels (i.e., solid levels of 25% or more).

As mentioned, the invention is directed to novel viscosity-stable high solids solution phenolics (i.e., solutions of esters of rosin-phenol condensates) and the process for preparing the same. In addition, the invention is also directed to ink formulations containing such solution phenolics.

DESCRIPTION OF THE PREFERRED EMBODIMENT

The novel viscosity-stable solution phenolics are prepared by adding a member selected from the group consisting of polyalkanolamines, polyether alcohols, and combinations thereof to high solids hydrocarbon solutions of esters of rosin-phenol condensates.

The production of esters of rosin-phenol condensates is well known in the ink industry, with a variety of esters being commercially available. A commonly used method for producing these esters is taught in Example 6 of U.S. Pat. No. 4,643,848 by Thomas et al. (which is hereby incorporated by reference).

Rosins which are suitable for use in producing these esters may be derived from tall oil rosin, wood rosin, or gum rosin.

Solvents which are suitable for producing solutions of these esters of rosin-phenol condensates include aliphatic hydrocarbons, aromatic hydrocarbons, and combinations thereof.

Polyalkanolamines which are suitable for use in the invention include compounds containing: a) from 1 to 5 amine groups and b) from 2 to 7 hydroxyl groups where c) each hydroxyl oxygen atom is separated from an amine nitrogen by 2 carbon atoms. These compounds can be generally represented by the chemical structure:

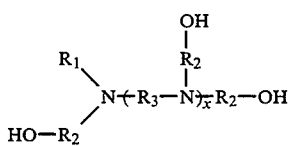

where $R^1$ is hydrogen, $C_1$–$C_{18}$ alkyl, or —$R^2$— OH; each $R^2$ is independently

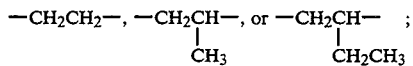

$R^3$ is $C_2$–$C_6$ alkylene or cycloalkylene; and x is 0 to 3.

Specific suitable polyalkanolamines include, but are not limited to, the following:
triethanolamine,
N-ethyldiethanolamine,
N,N,N',N'-tetrakis(hydroxypropyl)ethylenediamine,
N-methyldiethanolamine,
N-butyldiethanolamine,
triisopropanolamine,
N,N,N',N'-tetrakis(hydroxyethyl)-1,4-cyclohexanediamine,
N,N,N',N',N''-pentakis(hydroxypropyl)diethylenetriamine,
N,N,N',N'-tetrakis(hydroxyethyl)hexamethylenediamine, and combinations thereof.

Polyether alcohols which are suitable for use in the invention include compounds which can be generally represented by the chemical structure:

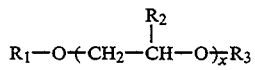

where $R^1$ is hydrogen or $C_1$–$C_{18}$ alkyl; $R^2$ is hydrogen, $CH_3$, or —$CH_2CH_3$; $R^3$ is hydrogen or $C_1$–$C_4$ alkyl; and x is 2 to 10.

Specific suitable polyether alcohols include, but are not limited to, the following:
diethylene glycol,
triethylene glycol,
diethylene glycol monomethyl ether,
diethylene glycol dimethyl ether,
diethylene glycol diethyl ether,
dipropylene glycol,
dipropylene glycol monoethyl ether,
diethylene glycol monobutyl ether,
tripropylene glycol,
tetraethylene glycol,
poly(ethylene glycol) 200,
poly(ethylene glycol) 400, and combinations thereof.

It should be noted that polyethylene glycols with molecular weights greater than about 580 are not suitable for use in this invention. Such higher molecular weight polyethylene glycols tend to be waxlike non-liquids and insoluble in hydrocarbon solvents.

The invention is practiced via the addition of from 0.2–4.0% (by weight of resin solids) of polyalkanolamine and/or polyether alcohol to high solids hydrocarbon solutions of esters of rosin-phenol condensates. The amount added is critical in that higher dosages may lead to difficulties when formulating inks (i.e., slow dry times and set-off problems). The preferred addition range of the polyalkanolamine and/or polyether alcohol is from about 0.5–2.0% The addition may occur during formulation of the high solids solution or after the solution has been produced. The high solids level of the hydrocarbon solutions of esters of rosin-phenol condensates ranges from 25.0–75.0% by weight, with the preferred range being about 35.0–55.0% by weight.

As appreciated in the art, the exact components and properties of components desired for any given ink application can vary, and, therefore, routine experimentation may be required to determine the optimal components and proportions of components for a given application and desired properties.

The following examples are provided to further illustrate the present invention and are not to be construed as limiting the invention in any manner.

EXAMPLE 1

A series of solution phenolics were produced by dissolving 45% by weight of different molecular weight production lots of JONREZ® RP-346 (a rosin-phenolic resin manufactured by Westvaco, Inc.) in 55% by weight of toluene to produce 45% solids solutions. Half of the resulting solutions were left untreated to serve as controls. The other half of the solutions were treated with varying amounts of triethanolamine (TEA). The results are listed in Table II below.

TABLE II

| RP-346 | Physical Property | Day 1 | Day 7 | Day 14 |
|---|---|---|---|---|
| Lot #1 Untreated | Brook. Viscosity (cP) | 6300 | 31,400 | 53,710 |
|  | Dilution[a] | — | — | — |
| Lot #1 with 1.2% TEA | Brook. Viscosity (cP) | 1650 | 1280 | 1680 |
|  | Dilution[a] | — | — | — |
| Lot #2 Untreated | Brook. Viscosity (cP) | 16,800 | 41,000 | 88,530 |
|  | Dilution | 297 | 297 | 314 |
| Lot #2 with 0.9% TEA | Brook. Viscosity (cP) | 1760 | 1880 | 2425 |
|  | Dilution[a] | — | — | — |
| Lot #3 Untreated | Brook. Viscosity (cP) | 6800 | 34,500 | 55,750 |
|  | Dilution[b] | 262 | 270 | 323 |
| Lot #3 with 1.6% TEA | Brook. Viscosity (cP) | 1200 | 1450 | 1625 |
|  | Dilution | 207 | 213 | 223 |
| Lot #4 Untreated | Brook. Viscosity (cP) | 9433 | 36,600 | 89,930 |
|  | Dilution | 262 | 278 | 291 |
| Lot #4 with 1.3% TEA | Brook. Viscosity (cP) | 1750 | 1540 | 1570 |
|  | Dilution | 219 | 230 | 219 |

Triethanolamine Suppresses Viscosity Growth in 45% Solids Solution

[a]The dilution values of TEA-treated Lots #1 and #2 were not measured.
[b]Dilution is reported as the milliliters of toluene added to 100 grams of the tested solution to bring its viscosity to 18 seconds in a #2 Shell cup at roughly 25° C.

Table II shows that triethanolamine suppressed viscosity growth in four different molecular weights of JONREZ RP-346. The maximum viscosity increase was 37% for Lot #2, which was treated with the smallest amount of TEA (0.9 weight percent TEA based on resin solids).

Moreover, Table II shows that 45% solids solutions of the four different lots dropped dramatically in viscosity upon treatment with triethanolamine. The four, untreated solutions of JONREZ RP-346 in toluene exhibited viscosities between 6300 cP and 16,800 cP. Upon treatment with 0.9% to 1.6% triethanolamine (by weight of resin), the viscosities of these same solutions dropped to between 1200 cP and 1750 cP. This substantial decrease in viscosity also was observed in the physical appearance of the stirred solutions. The four, untreated, 45% solids solutions exhibited Weisenberg effects, tending to climb the stirrer shaft during sample preparation at 80° C. However, upon addition of the triethanolamine, a deep vortex immediately developed in each of these solutions, attesting to the significant viscosity-lowering effect of TEA.

EXAMPLE 2

A series of solution phenolics were produced by dissolving 50% (or 55%) by weight of different molecular weight production lots of JONREZ ® RP-346 in 50% (or 45%) by weight of toluene to produce 50% (or 55%) solids solutions. To these solution phenolics were added varying amounts of triethanolamine (TEA). The results are listed in Table III below.

TABLE III

Triethanolamine Treatment Stabilizes Viscosity and Dilution In 50% and 55% Solids Solutions

| RP-346 | Physical Property | Day 1 | Day 7 | Day 14 |
| --- | --- | --- | --- | --- |
| Lot #5 | Brook. Viscosity | 3030 | 4006 | 3230 |
| 50% Solids | (cP) | | | |
| 1.7% TEA | Dilution | 240 | 250 | — |
| Lot #6 | Brook. Viscosity | 3550 | 4580 | 4420 |
| 50% Solids | (cP) | | | |
| 1.6% TEA | Dilution | 260 | 264 | 251 |
| Lot #7 | Brook. Viscosity | 17,250 | 15,270 | 14,800 |
| 55% Solids | (cP) | | | |
| 1.7% TEA | Dilution | 297 | 284 | 299 |

Triethanolamine also stabilized the viscosity of solutions prepared at solids higher than 45%. Table III shows that addition of around 1.7 weight percent triethanolamine stabilized the viscosity and dilution properties of RP-346 solutions prepared at 50% and 55% solids. Table III shows no control data for the viscosity of untreated solutions of RP-346 at 50% and 55% solids because the solutions were virtually gelled in the reaction vessel at 80° C. prior to triethanolamine addition. It was evident, from this gel formation at 80° C., that at 25° C., the Brookfield viscosities of these untreated 50-55% solids solutions would have been immeasurable.

EXAMPLE 3

A solution phenolic was produced by dissolving 45% by weight of JONREZ ® RP-346 in 55% by weight of toluene to produce a solids solution. A portion of the solution phenolic was left untreated as a control group. The remainder of the solution phenolic was treated via the addition of varying amounts of different polyalkanolamines. The results are listed in Table IV below.

TABLE IV

Number of 1,2-Relationships Between Hydroxyl and Amine Groups Correlates with Viscosity Stability Effectiveness

| Number of 1,2-Relationships | Additive and Treatment Level[a] | Physical Property | Day 1 | Day 7 | Day 14 |
| --- | --- | --- | --- | --- | --- |
| 0 | Control (None) | Brook. Viscosity (cP) | 9430 | 36,600 | 89,930 |
| | | Dilution | 262 | 388 | 291 |
| 3 | Triethanolamine 1.3 | Brook. Viscosity (cP) | 1750 | 1540 | 1570 |
| | | Dilution | 219 | 230 | 219 |
| 2 | N-Ethyldiethanolamine | Brook. Viscosity | 1540 | 1630 | 1711 |

TABLE IV-continued

Number of 1,2-Relationships Between Hydroxyl and Amine Groups Correlates with Viscosity Stability Effectiveness

| Number of 1,2-Relationships | Additive and Treatment Level[a] | Physical Property | Day 1 | Day 7 | Day 14 |
| --- | --- | --- | --- | --- | --- |
| | 1.8 | (cP) | | | |
| | | Dilution | 215 | 223 | 223 |
| 1 | N,N-Diethylethanolamine 1.97 | Brook. Viscosity (cP) | 4516 | 11,660 | 13,050 |
| | | Dilution | 251 | 262 | 262 |
| 0 | Triethylamine 1.7 | Brook. Viscosity (cP) | 9000 | — | 136,750 |
| | | Dilution | 275 | — | 310 |
| 4 | THPD[b] 2.0 | Brook. Viscosity (cP) | 1060 | 1260 | 1115 |
| | | Dilution | 205 | 228 | — |

[a]Weight percent of additive used, based on resin solids in solution.
[b]THPD is an abbreviation for N,N,N',N'-tetrakis(2-hydroxypropyl)-ethylenediamine.

Table IV shows the viscosity-stability effects of these additives. The data indicates that at least two hydroxyalkyl groups were required for viscosity stability. Note that triethylamine, which lacked hydroxyl groups, did not suppress viscosity growth. Similarly, a solution treated with N,N-diethylethanolamine, which contained a single 1,2-relationship between its hydroxyl and amine groups, was not viscosity-stable. In contrast, N-ethyldiethanolamine contained two hydroxyethyl groups, and this additive suppressed viscosity growth to almost the same extent as triethanolamine.

The data in Table IV strongly suggests that the number of 1,2-relationships between hydroxyl and amine groups correlated with the extent of viscosity reduction. To confirm this the effect of adding 2.0 weight percent N,N,N'N'-tetrakis(2-hydroxypropyl)-ethylenediamine (THPD) was examined. This compound contained four 1,2-relationships between its hydroxyl and amine groups. The viscosity-lowering effect of this additive appeared to be greater than any other compound in this series of triethanolamine analogues. The initial solution viscosity fell from 9430 cP in the untreated solution to 1060 cP in the THPD-treated one. However, after aging 14 days the THPD-treated solutions exhibited a white precipitate.

EXAMPLE 4

A series of solution phenolics were produced by dissolving 45% by weight of different molecular weight production lots of JONREZ ® RP-346 in 55% by weight of toluene to produce 45% solids solutions. A portion of one solution phenolic was left untreated as a control group. The remainder of the solution phenolics were treated via the addition of varying amounts of different polyether alcohols. The results are listed in Table V below.

TABLE V

Polyether Alcohol Treatment Stabilizes Viscosity and Dilution In 45% Solids Solutions

| RP-346 | Additive and Treatment Level[a] | Physical Property | Day 1 | Day 7 | Day 14 |
| --- | --- | --- | --- | --- | --- |
| Lot #8 | Control (None) | Brook. Viscosity (cP) | 6800 | 34,500 | 55,750 |

TABLE V-continued

Polyether Alcohol Treatment Stabilizes Viscosity and Dilution In 45% Solids Solutions

| RP-346 | Additive and Treatment Level[a] | Physical Property | Day 1 | Day 7 | Day 14 |
|---|---|---|---|---|---|
| Lot #8 | Tetraethylene-Glycol 2.1 | Dilution Brook. Viscosity (cP) | 262 1740 | 271 2600 | 323 3550 |
| Lot #9 | Diethylene-Glycol 1.3 | Dilution Brook. Viscosity (cP) | 235 2280 | 245 2480 | 253 2970 |
| Lot #10 | Diethylene-Glycol 0.9 | Dilution Brook. Viscosity (cP) | 235 2250 | 249 3370 | 241 4860 |
| | | Dilution | 233 | 247 | 266 |

[a]Weight percent of additive used, based on resin solids in solution.

As evidenced by the results shown in Table V, the addition of polyether alcohols result in the stabilization of viscosity and dilution values in solution phenolics.

EXAMPLE 5

A series of solution phenolics were produced by dissolving 45% by weight of different molecular weight production lots of JONREZ® RP-346 in 55% by weight of toluene to produce four 45% solids solutions. The viscosities and molecular weights of the production lots are listed in Table VI below.

TABLE VI

Viscosities and Molecular Weights of Four Lots of RP-346

| Lot | Brookfield Viscosity at 25° C. and 45% Solids in Toluene (cP) | Resin Molecular Weight Characteristics* | | | |
|---|---|---|---|---|---|
| | | Mw | Mw/Mn | Mz/1000 | Mz + 1/1000 |
| #11 | 2200 | 116,400 | 87 | 917 | 1485 |
| #12 | 2420 | 131,400 | 94 | 951 | 1509 |
| #13 | 2200 | 118,800 | 87 | 973 | 1828 |
| #14 | 2350 | 83,100 | 61 | 621 | 1031 |

*Column configuration: $10^5$, $10^4$, 500, and 100 angstrom.

A portion of each solution phenolic was left untreated as a control group. The remainder of the solution phenolics were treated via the addition of either 1.0% or 1.5% of TEA. One half of the treated solution phenolics were sealed in jars and stored at ambient temperatures for 2 weeks. The results are listed in Table VII below.

TABLE VII

Variation Over Fourteen Days in the Viscosities and Dilutions of Triethanolamine-Treated RP-346 Solutions

| Lot | Weight Percent Triethanolamine | 25° C. Brookfield Viscosity (cP) | | Dilution* (mL) | |
|---|---|---|---|---|---|
| | | day 1 | day 14 | day 1 | day 14 |
| #11 | 0 | 2250 | 4600 | 190 | 190 |
| | 1.0 | 1060 | 1440 | 170 | 150 |
| | 1.5 | 970 | 1160 | 150 | 150 |
| #12 | 0 | 2220 | 5120 | 190 | 210 |
| | 1.0 | 1090 | 1400 | 160 | 170 |
| | 1.5 | 1000 | 1230 | 160 | 160 |
| #13 | 0 | 2240 | 4500 | 180 | 200 |
| | 1.0 | 1090 | 1400 | 170 | 170 |
| | 1.5 | 1000 | 1220 | 160 | 160 |
| #14 | 0 | 1710 | 1800 | 170 | 170 |
| | 1.0 | 820 | 1080 | 160 | 150 |
| | 1.5 | 570 | 980 | 140 | 140 |

*mL of toluene per 100 grams of sample to give 18 seconds in #2 Shell cup.

The remaining half of the treated and untreated solution phenolics were utilized as let-down vehicles in the preparation of gravure inks. The gravure ink formulation consisted of: 1) 32% by weight of a red pigment formulation containing a 24% base of lithol rubine, 2) 50% by weight of the respective let-down solution phenolic, and 3) 18% by weight of virgin toluene. The ink formulations were agitated via a Red Devil paint shaker for 30 minutes, after which time the inks were diluted to a value of 18 seconds as measured by a Shell #2 cup at 25° C.

The gravure inks were subsequently sealed in jars and stored at ambient temperatures for 2 weeks. The results are listed in Table VIII below.

TABLE VIII

Fourteen-Day Viscosity and Dilution Changes in Gravure Inks

| Lot | Wt % Triethanolamine | 25° C. Brookfield Viscosity (cP) | | Dilution[a] (sec) | | 60° Ink Gloss | |
|---|---|---|---|---|---|---|---|
| | | day 1 | day 14 | day 1 | day 14 | day 1 | day 14 |
| #11 | 0 | 2940 | 8250 | 19.6 | 22.4 | 51.0 | 67.6 |
| | 1.0 | 1340 | 1500 | 17.6 | 18.5 | 50.5 | 66.1 |
| | 1.5 | 1040 | 1240 | 19.4 | 18.0 | 51.4 | 63.6 |
| #12 | 0 | 2900 | 8100 | 19.6 | 23.7 | 52.8 | 66.7 |
| | 1.0 | 1300 | 1540 | 17.8 | 19.2 | 54.65 | 67.9 |
| | 1.5 | 1140 | 1440 | 17.8 | 18.6 | 54.0 | 66.5 |
| #13 | 0 | 2540 | 5400 | 19.7 | 22.7 | 51.5 | 65.3 |
| | 1.0 | 1240 | 1560 | 18.1 | 18.9 | 50.1 | 66.1 |
| | 1.5 | 1100 | 1280 | 17.8 | 17.9 | 49.7 | 63.2 |
| #14 | 0 | 2060 | 3350 | 18.4 | 19.5 | 49.9 | 67.9 |
| | 1.0 | 1020 | 1200 | 16.8 | 17.5 | 48.8 | 65.0 |
| | 1.5 | 920 | 1060 | 16.3 | 16.4 | 47.9 | 64.9 |

[a]Dilution differences are recorded as the seconds required for solutions to pass through a #2 Shell cup when diluted with 120 mL of toluene.

Table VIII shows the changes in viscosity and dilution of the gravure inks derived from the triethanolamine-treated, let-down vehicles. Untreated inks increased in viscosity roughly 60% to 180% over 14 days. Inks made from let-down vehicles treated with 1.0% triethanolamine increased in viscosity from 12 to 26% over 14 days. Although increasing the triethanolamine level in the let-down vehicle to 1.5% reduced the viscosity of the vehicle and the resulting ink, the viscosity growth characteristics at the 1.0 and 1.5% levels were comparable.

The dilution measurements in Table VIII were made by treating all of the samples with 120 mL of toluene and then recording the time required for the diluted sample to pass through a #2 Shell cup. All of the untreated samples gave higher seconds readings, indicating that they were more dilutable than the treated samples.

Drying rate differences between treated and untreated inks were estimated in a simulated drying rate test. Samples of treated and untreated inks were drawn down on a grind gauge, and then a piece of paper stock was impressed onto the drawdowns. Slower drying inks transfer longer drawdowns to the paper. The results are listed in Table IX below.

TABLE IX

Lengths (cm) of Drawdowns in Simulated Drying Rate Experiments

| Lot | Wt % Triethanolamine in Let-Down Vehicle | | |
|---|---|---|---|
| | 0.0 | 1.0 | 1.5 |
| #11 | 12.1 | 12.8 | — |
| | 13.2 | — | 13.6 |
| #12 | 9.5 | 10.3 | — |

TABLE IX-continued

| | Lengths (cm) of Drawdowns in Simulated Drying Rate Experiments | | |
|---|---|---|---|
| | Wt % Triethanolamine in Let-Down Vehicle | | |
| Lot | 0.0 | 1.0 | 1.5 |
| | 9.4 | — | 10.4 |
| #13 | 12.0 | 12.5 | 0 |
| | 11.0 | — | 12.1 |
| #14 | 10.0 | 11.8 | — |
| | 10.0 | — | 11.4 |

Table IX shows that, in all cases, the TEA-treated inks gave longer drawdowns than their untreated counterparts, indicating that their drying rates were lower.

It is important to note, however, that many of the TEA-treated inks gave drawdowns with lengths within the range exhibited by the untreated inks. For example, the drawdowns of untreated inks ranged in length from 9.4 cm to 13.2 cm. The drawdowns of inks made from let-down vehicles treated with 1.0 and 1.5% TEA ranged in length from 10.3 cm to 13.6 cm. In other words, all but one of the treated ink samples (Lot #11 with 1.5% TEA) gave drawdowns with lengths (and, hence, drying rates) within the range exhibited by the four lots of untreated inks.

Although the drying rates of gravure inks formulated with TEA were somewhat increased, the rates were still comparable to those of the control inks. TEA treatment did not adversely affect ink film gloss, film density, or bronzing.

EXAMPLE 6

Esters of rosin-phenol condensates suitable for use in the present invention may be produced via the following procedure. To a suitable reaction vessel equipped with an overhead stirrer, condenser, and thermometer is added 100 parts of tall oil rosin. The rosin is heated under an inert gas blanket to 150° C., at which time 0.05 parts magnesium oxide and 15 parts nonylphenol are added. The mixture is allowed to cool to 125° C., whereupon 5.1 parts of paraformaldehyde are added. The temperature of this mixture is held at 125° C. for one hour, then increased to 180° C. At this time, 0.10 parts of 50% active phosphinic acid is added and stirred in well, after which 3.0 parts of maleic anhydride are added. The mixture is stirred at 180° C. for 1 hour; then the temperature is increased to 200° C. and 13.0 parts of pentaerythritol are added. The temperature is increased to 250° C., held for 0.5 hours, then raised to 280° C. and held for an acid value less than 25.

Many modifications and variations of the present invention will be apparent to one of ordinary skill in the art in light of the above teachings. It is therefore understood that the scope of the invention is not to be limited by the foregoing description, but rather is to be defined by the claims appended hereto.

What is claimed is:

1. An improved high solids solution phenolic composition comprising a mixture of:
   (a) from 25.0 to 75.0% by weight of resin esters of rosin-phenol condensates, and
   (b) from 25.0 to 75.0% by weight of a solvent selected from the group consisting of aliphatic hydrocarbons, aromatic hydrocarbons, and combinations thereof; wherein the improvement comprises the addition to the mixture of from 0.2–4.0% by weight of said resin esters of a member selected from the group consisting of polyalkanolamines, polyether alcohols, and combinations thereof; wherein said polyalkanolamines contain:
   (1) from 1 to 5 amine groups,
   (2) from 2 to 7 hydroxyl groups, and
   (3) where each hydroxyl oxygen atom is separated from an amine nitrogen by 2 carbon atoms; and wherein said polyether alcohols are represented by the chemical structure:

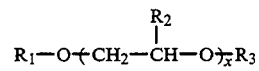

where $R^1$ is hydrogen or $C_1$–$C_{18}$ alkyl;
$R^2$ is hydrogen, $CH_3$, or $-CH_2CH_3$;
$R^3$ is hydrogen or $C_1$–$C_4$ alkyl; and
x is 2 to 10.

2. The improved composition of claim 1 comprising a mixture of:
   (a) from 35.0 to 55.0% by weight of resin esters of rosin-phenol condensates, and
   (b) from 45.0 to 65.0% by weight of a solvent selected from the group consisting of aliphatic hydrocarbons, aromatic hydrocarbons, and combinations thereof; wherein the improvement comprises the addition to the mixture of from 0.2–4.0% by weight of said resin esters of a member selected from the group consisting of polyalkanolamines, polyether alcohols, and combinations thereof; wherein said polyalkanolamines contain:
   (1) from 1 to 5 amine groups,
   (2) from 2 to 7 hydroxyl groups, and
   (3) where each hydroxyl oxygen atom is separated from an amine nitrogen by 2 carbon atoms;
and wherein said polyether alcohols are represented by the chemical structure:

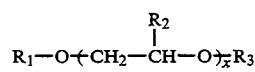

where $R^1$ is hydrogen or $C_1$–$C_{18}$ alkyl;
$R^2$ is hydrogen, $CH_3$, or $-CH_2CH_3$;
$R^3$ is hydrogen or $C_1$–$C_4$ alkyl; and
x is 2 to 10.

3. The improved composition of claim 1 comprising a mixture of:
   (a) from 25.0 to 75.0% by weight of resin esters of rosin-phenol condensates, and
   (b) from 25.0 to 75.0% by weight of a solvent selected from the group consisting of aliphatic hydrocarbons, aromatic hydrocarbons, and combinations thereof; wherein the improvement comprises the addition to the mixture of from 0.5–2.0% by weight of said resin esters of a member selected from the group consisting of polyalkanolamines, polyether alcohols, and combinations thereof; wherein said polyalkanolamines contain:
   (1) from 1 to 5 amine groups,
   (2) from 2 to 7 hydroxyl groups, and
   (3) where each hydroxyl oxygen atom is separated from an amine nitrogen by 2 carbon atoms;
and wherein said polyether alcohols are represented by the chemical structure:

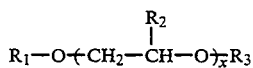

where $R^1$ is hydrogen or $C_1$–$C_{18}$ alkyl;
$R^2$ is hydrogen, $CH_3$, or —$CH_2CH_3$;
$R^3$ is hydrogen or $C_1$–$C_4$ alkyl; and
x is 2 to 10.

4. The improved composition of claim 1 wherein said polyalkanolamines are represented by the chemical structure:

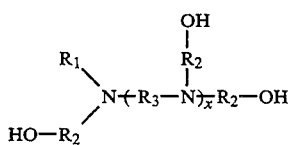

where $R^1$ is hydrogen, $C_1$–$C_{18}$ alkyl, or —$R^2$—OH; each $R^2$ is independently

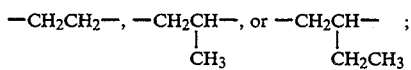

$R^3$ is $C_2$–$C_6$ alkylene or cycloalkylene;
and x is 0 to 3.

5. The improved composition of claim 1 wherein said polyalkanolamine is a member selected from the group consisting of:
triethanolamine,
N-ethyldiethanolamine,
N,N,N',N'-tetrakis(hydroxypropyl)ethylenediamine,
N-methyldiethanolamine,
N-butyldiethanolamine,
triisopropanolamine,
N,N,N',N'-tetrakis(hydroxyethyl)-1,4-cyclohexanediamine,
N,N,N',N',N''-pentakis(hydroxypropyl)diethylenetriamine,
N,N,N',N'-tetrakis(hydroxyethyl)hexamethylenediamine, and combinations thereof.

6. The improved composition of claim 1 wherein said polyether alcohol is a member selected from the group consisting of:
diethylene glycol,
triethylene glycol,
diethylene glycol monomethyl ether,
diethylene glycol dimethyl ether,
diethylene glycol diethyl ether,
dipropylene glycol,
dipropylene glycol monoethyl ether,
diethylene glycol monobutyl ether,
tripropylene glycol,
tetraethylene glycol,
poly(ethylene glycol) 200,
poly(ethylene glycol) 400, and combinations thereof.

7. A gravure printing ink composition comprising pigment and the improved composition of claim 1.

* * * * *